(12) United States Patent
Kennedy, Jr.

(10) Patent No.: US 10,558,644 B2
(45) Date of Patent: *Feb. 11, 2020

(54) SOURCE INDEPENDENT QUERY LANGUAGE

(71) Applicant: Vinyl Development LLC, Miami Beach, FL (US)

(72) Inventor: Thomas R. Kennedy, Jr., Miami Beach, FL (US)

(73) Assignee: Vinyl Development LLC, Miami Beach, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/407,811

(22) Filed: Jan. 17, 2017

(65) Prior Publication Data

US 2017/0124140 A1    May 4, 2017

Related U.S. Application Data

(63) Continuation of application No. 15/042,380, filed on Feb. 12, 2016, now Pat. No. 9,547,687, which is a continuation of application No. 14/641,620, filed on Mar. 9, 2015, now Pat. No. 9,275,099.

(51) Int. Cl.
*G06F 16/23* (2019.01)
*G06F 16/245* (2019.01)
*G06F 16/25* (2019.01)
*G06F 16/242* (2019.01)

(52) U.S. Cl.
CPC ........ *G06F 16/2365* (2019.01); *G06F 16/245* (2019.01); *G06F 16/2423* (2019.01); *G06F 16/258* (2019.01)

(58) Field of Classification Search
None
See application file for complete search history.

(56) References Cited

U.S. PATENT DOCUMENTS

| | | | |
|---|---|---|---|
| 7,062,502 B1 | 6/2006 | Kesler | |
| 7,299,493 B1 * | 11/2007 | Burch | G06Q 40/04 380/1 |
| 7,676,499 B2 | 3/2010 | Dorsett, Jr. | |
| 8,417,715 B1 | 4/2013 | Bruckhaus et al. | |
| 8,863,156 B1 | 10/2014 | Lepanto et al. | |
| 9,275,099 B1 * | 3/2016 | Kennedy, Jr. | G06F 17/30424 |

(Continued)

*Primary Examiner* — Wilson Lee
(74) *Attorney, Agent, or Firm* — Fish & Richardson P.C.

(57) ABSTRACT

Methods, systems, and apparatus, including computer programs encoded on computer storage media, for a source independent query language. One of the methods includes receiving a first executable statement, the first executable statement referencing a second set of fields in a dataset, the first executable statement having instructions to cause the query processor to perform operations on data in the dataset. The method includes Generating a second executable statement based on the first set of fields and the first executable statement. The method includes determining a mapping between the first set of fields and the second set of fields. The method includes specifying a derived dataset using the corresponding values and the mapping. The method includes generating instructions to cause the query processor to perform the operations on the derived dataset. The method includes sending the second executable statement to the query processor.

15 Claims, 7 Drawing Sheets

(56) References Cited

U.S. PATENT DOCUMENTS

| | | | |
|---|---|---|---|
| 9,547,687 B2* | 1/2017 | Kennedy, Jr. | G06F 17/30424 |
| 9,705,918 B2* | 7/2017 | Porras | H04L 63/20 |
| 2005/0060691 A1* | 3/2005 | Das | G06F 8/433 |
| | | | 717/132 |
| 2005/0289013 A1 | 12/2005 | Goldberg | |
| 2006/0020582 A1 | 1/2006 | Dettinger et al. | |
| 2008/0046981 A1* | 2/2008 | Philyaw | G06F 17/30876 |
| | | | 726/4 |
| 2008/0120286 A1* | 5/2008 | Dettinger | G06F 17/30477 |
| 2008/0256082 A1 | 10/2008 | Davies | |
| 2009/0254516 A1 | 10/2009 | Meiyyappan | |
| 2010/0325122 A1 | 12/2010 | Yassin | |
| 2011/0246415 A1 | 10/2011 | Li et al. | |
| 2012/0166238 A1* | 6/2012 | Mohanty | G06Q 10/063 |
| | | | 705/7.11 |
| 2013/0066801 A1* | 3/2013 | Phillips | G06Q 40/00 |
| | | | 705/36 R |
| 2013/0282710 A1* | 10/2013 | Raghavan | G06F 17/30554 |
| | | | 707/728 |
| 2013/0311445 A1 | 11/2013 | Narita | |
| 2014/0075519 A1* | 3/2014 | Porras | H04L 63/20 |
| | | | 726/4 |
| 2014/0095814 A1* | 4/2014 | Marden | G06F 9/30043 |
| | | | 711/156 |
| 2014/0379693 A1 | 12/2014 | May | |

\* cited by examiner

SOURCE INDEPENDENT QUERY LANGUAGE

CLAIM OF PRIORITY

This application is a continuation and claims priority under 35 U.S.C. § 120 to U.S. patent application Ser. No. 15/042,380 filed on Feb. 12, 2016, which is a continuation and claims the benefit of U.S. patent application Ser. No. 14/641,620 filed on Mar. 9, 2015. The above applications are incorporated here in their entirety by reference.

BACKGROUND

This specification relates to graphical user interfaces.

Data validation is the process of verifying that a program operates on clean, correct and useful data. Data validation processes use routines that check for correctness, meaningfulness, and security of data that are input into the system. Validation can be performed on the client-side (for example, on a web page or on the server side). Client side validation general includes the use of scripting languages. Server side validation may be written in a conventional programming language.

SUMMARY

The system described herein enables SQL queries to be written once and executed against in-memory data as well as data persistently stored in a database. The SQL statement is modified to perform functions against the data on a user interface. For example, the data on the user interface can be mapped into fields referenced in the SQL statement. The SQL statement can then be programmatically altered to include that data in the place of a table.

In general, one innovative aspect of the subject matter described in this specification can be embodied in methods that include the actions of obtaining data from a user interface, the data including a first set of fields and corresponding values. The methods include the actions of receiving a first executable statement, the first executable statement referencing a second set of fields in a table in a relational database, the first executable statement having instructions to cause the database to perform operations on data in the table. The methods include the actions of generating a second executable statement based on the first set of fields and the first executable statement. The methods include the actions of determining a mapping between the first set of fields and the second set of fields, specifying a derived table using the corresponding values and the mapping. The methods include the actions of generating instructions to cause the database to perform the operations on the derived table. The methods include the actions of sending the second executable statement to the database.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. The methods may include identifying a first data type of a first field in the first set of fields, identifying a second data type of a second field in the second set of fields, identifying a conversion command to convert from the first data type to the second data type, and adding the conversion command to the second executable statement. The methods may include the actions of receiving result data from the database associated with the execution of the operations in the second executable statement, and determining that the data from the user interface is invalid based on the result data. The methods may include the actions of identifying a first operation of the operations in the first executable statement, identifying a proprietary function corresponding to the first operation and inserting the proprietary function into the second executable statement. The methods may include the actions of validating data in the database by providing the first executable statement to the database. Generating a second executable statement based on the first set of fields and the first executable statement may include providing an alias for the derived table, and updating the second executable statement to reference the alias.

Particular embodiments of the subject matter described in this specification can be implemented to realize one or more of the following advantages. Using the same statement to validate data on a user interface and data stored in a database has the advantages of reducing the number of programs that need to be developed and maintained. The costs associated with developing, testing, and maintaining a computer program or application are thereby reduced.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The system described herein allows data validation procedures to be written once and then executed on client data, server data, or stored persistent data.

Data validation may be performed on a client or a server. Generally, performing validation on the client provides for a better user experience while performing data validations on a server is more reliable. It is not uncommon for a system to perform data validations twice. Data may be validated a first time on the user interface and a second time when the data is stored in a persistent database. Some systems do a periodic data cleansing, where the data stored in the database is validated for a third time.

On a conventional hyper-text markup language (HTML) web page delivered to a remote device using the hypertext transport protocol (HTTP), client side validations can be performed using client side scripting (programs specifically developed to access and manipulate items presented in a web browser), however, because the system does not control all data that is transmitted from the client, the application generally re-validates the data prior to persisting it to the database. Using conventional techniques, the script that is used to validate data on the client cannot be reused to validate the data before it persists or after it has been stored. Instead, the data validation is programmed a second time in a conventional programming language.

Periodically a company may choose to audit the integrity of their data (for example, to determine if programming errors, human error, or other issues (such as data corruption or management override) has caused otherwise invalid data to be inserted into the database). Validations to perform this audit are designed to perform operations on a large number of data records at once, therefore, they are generally programmed for a third time using a database query language, such as SQL or a variant thereof.

Spreading the data integrity and business rules across three tiers (database, application server, rich client) and potentially three languages (SQL, server-side, client-side) leads to duplication and maintenance issues. For example, client side validation may be performed using a scripting language, such as JAVASCRIPT. Server-side validation may be performed using a conventional programming language, such as JAVA or C++. Database validations may be performed using database constraints or databased queries (for example, SQL).

Traditionally, a SQL query selects data that's stored in a table within a database. Executing the query requires the data to be persisted to the database.

Figure 1:
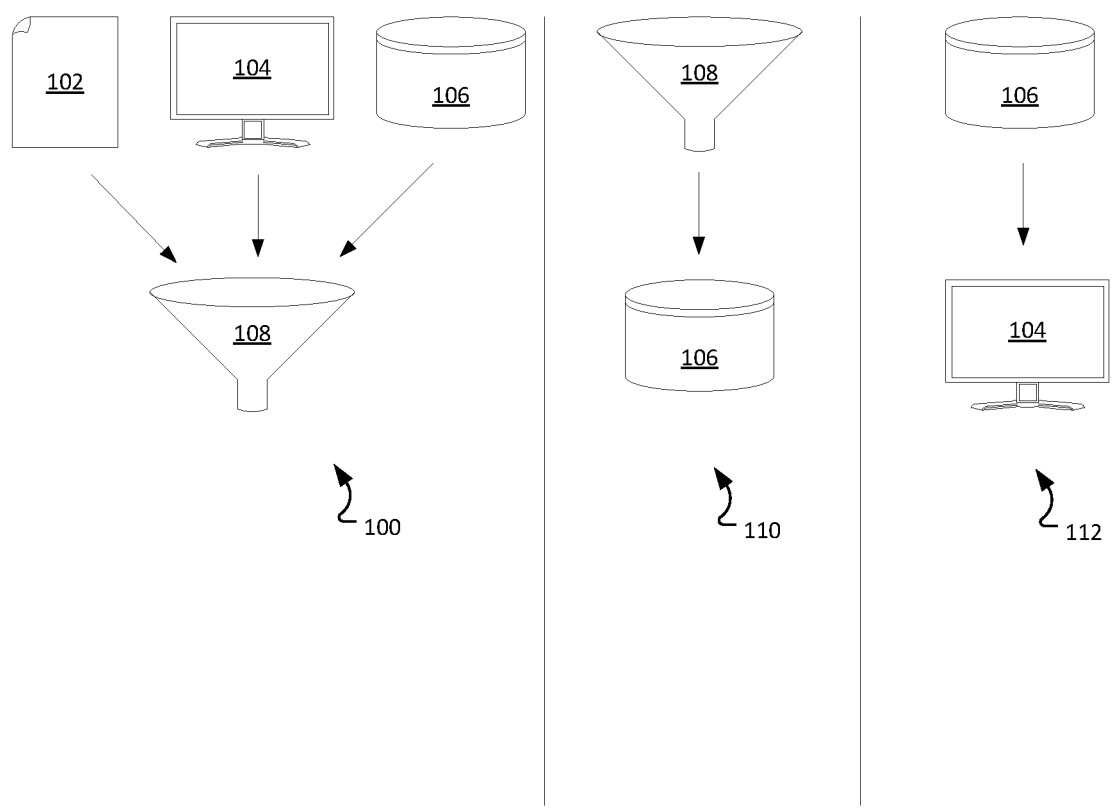
FIG. 1 illustrates an example of executing MvSQL code against data from a user interface.

FIG. 1 illustrates an example of executing MvSQL code against data from a user interface. Referring to a first section 100 of the figure, a query processor 108 accepts a MvSQL statement 102 and data from a user interface 104. In some implementations, the query processor 108 also accepts a data definition from, for example, a database 106. While the disclosure herein refers to MvSQL, the processes and systems described herein are not limited to MvSQL in particular and can be applied to any query language that can be transformed into a computer-executable statement.

A MvSQL statement is a version of a SQL query language that can be converted into other versions of the SQL query language. In general, SQL is a special-purpose programming language designed for managing data held in a relational database management system (RDBMS) or for stream processing in a relational data stream management system (RDSMS). While SQL serves as a rough standard, different RDBMS vendors have constructed their own versions of SQL. For example, ORACLE, SQLSERVER, and DB2 (all relational database vendors) each have their own proprietary SQL syntax. MvSQL is a version of SQL that is generally compatible or transformable into different proprietary syntax. In general, MvSQL specifies the operations of a SQL statement that can be transformed into the proper syntax for the proprietary SQL language at runtime.

The user interface 104 may be, for example, a web page presented in a web browser or a client side application developed using conventional graphical user interface technologies. In general, the user interface may include fields that hold values. For example, the user interface may include input fields which accept input from an input device on the client computer or other user device. The user interface may also include hidden or uneditable fields that store data. The input field may be an HTML input field, check box, radio button, select box, multiple select box, slider, etc. The storage fields may include a hidden field, label, or read only input field. In some scenarios, additional data may be stored in HTTP Cookies (data sent from a website and stored in a user's web browser while the user is browsing that website) or in an HTTP Session (data associated with individual visitors to a web site).

A data definition defines data types for different fields. A data type is a classification identifying one of various types of data, such as numeric, decimal, character, variable length character strings, date time, etc. The data type determines the possible values for a data value. The data type can also determine operations that can be done on the data value. The data type can also define how the data is stored in a persistent data store and in memory.

The query processor can accept the MvSQL statement and the data from the user interface the data definition and generate a SQL statement that can be executed by a relational database. Referring to the second section 110 of FIG. 1, the SQL statement generated by the query processor 108 may include instructions that cause a relational database 106 or in-memory query processing system to perform operations on data that has not been persistently stored in the relational database. For example, the SQL statement may select values from a derived table. In general, a derived table is a temporary table created by means of a subquery in the FROM clause of a SQL SELECT statement. The derived table is specific to the SQL command that creates it. In some implementations, the derived table exists in the non-persistent memory of a computer executing the database and behaves like a standard view or table.

Accessing data in the derived table can be relatively fast because the derived table can exist only in memory. Using the existing relational database 106 process, the SQL statement has the advantage of being processed without requiring an additional overhead in developing, obtaining, or executing a separate in-memory query processor. In contrast, an in-memory query processing system can be optimized to execute queries in memory.

The SQL statement is provided to a relational database 106 for processing. The SQL statement can be executed by the relational database. Referring to the third portion 112 of FIG. 1, results from the SQL statement executed by the relational database 106 can be provided to the user interface 104. For example, the data returned from the SQL statement may be sent to the user interface 104 directly. Alternatively, the data returned from the SQL statement may be further transformed before being provided to the user interface 104.

The user interface 104 can process the provided results. For example, receiving results of a SQL statement that verify that the contents of the fields on the user interface 104 are valid may cause the user interface 104 to identify and highlight one or more fields that contain invalid values. Alternatively or additionally, the user interface 104 may display an error message. In general, the user interface may utilize the results of the SQL statement in order to enhance the experience of the user.

Figure 2:
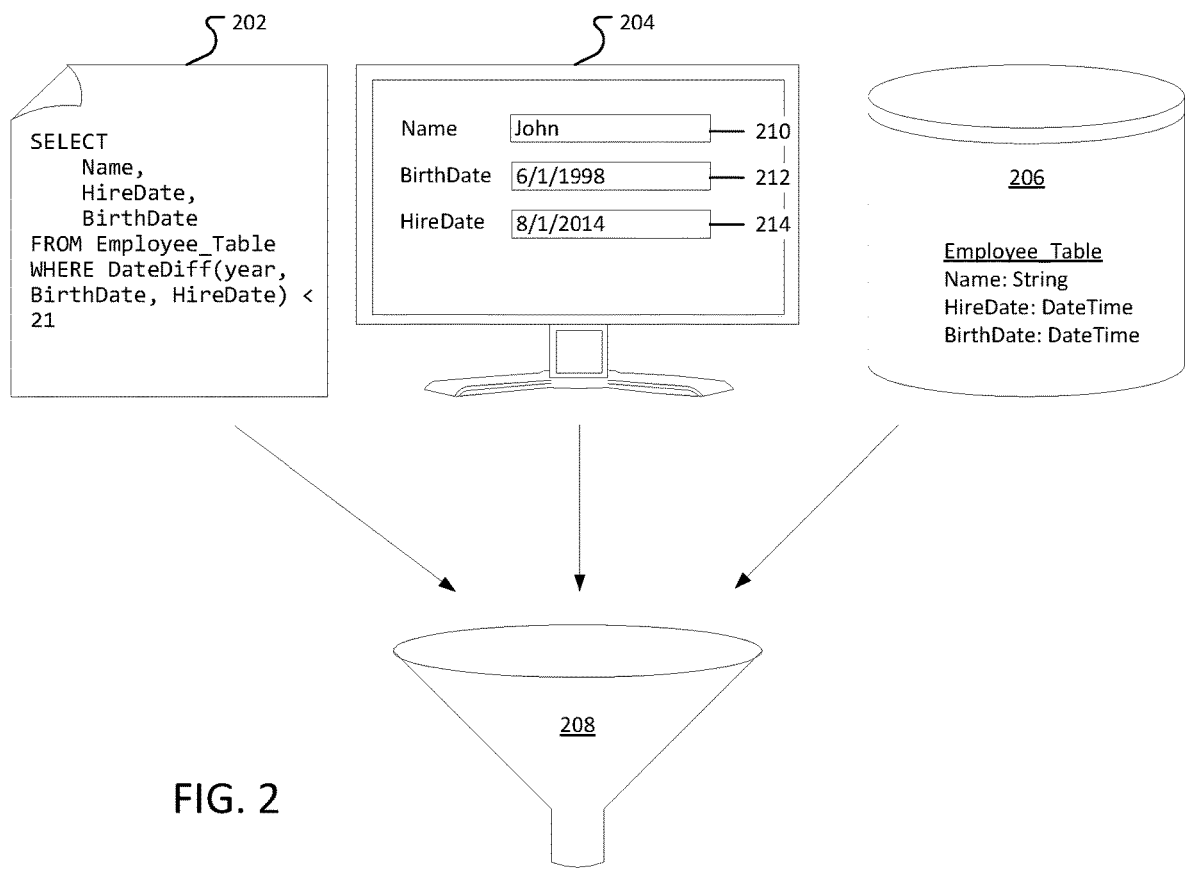
FIGS. 2-4 illustrates an example of generating an SQL statement against data on a user interface.

FIG. 2 illustrates an example process of generating an SQL statement. Generally, a query processor 208 can generate an SQL statement using information from a MvSQL statement 202, a user interface 204, and, optionally, a data dictionary 206.

The MvSQL Statement 202 provides instructions for manipulating data. In this example, the MvSQL statement is "SELECT Name, HireDate, Birthdate, FROM Employee_Table WHERE DateDiff (year, BirthDate, HireDate) <21". The MvSQL statement instructs a database to object (select) the values from the columns Name, HireData, and Birthdate from a table named Employee_Table that meet the criteria that the difference between the value in the BirthDate column and the value in the HireDate columns is less than 21 years.

A user interface 204 can be used to obtain data from a user. The user interface 204 includes fields that contain data. Each field has a name. For example, a Birthdate field 212 may be generated based on the html text:

<INPUT type="text" name="Birthdate" maxlength="10">

In this example, the name attribute provides a name by which the field may be referenced (in this example, "Birthdate"). The size attribute indicates the size of the field in characters. The type attribute with the value "text" indicates that the input field is a text field. The possible values for the type attribute depend on the version of HTML standard. For example, other possible values for the type attribute include but are not limited to: button, checkbox, color, date, datetime, datetime-local, email, file, hidden, image, month, number, password, radio, range, reset, search, submit, tel, text, time, url, and week. Not all types are available for all versions of HTML. For example, datetime and datetime-local are only available in HTML5 (i.e. the $5^{th}$ revision of the HTML standard).

In general, the names associated with an input field are not otherwise related to the graphical presentation of the field. The labels shown on the user interface 204 are included for explanatory purposes. The names of the fields are defined within the attributes of the HTML field and are generally not displayed on the screen. Instead, labels located near the input fields may not correspond directly to any attribute of the underlying HTML.

In this example, the user interface 204 includes an Name field 210, a BirthDate field 212, and a HireDate field 214.

A data dictionary 206 includes information about the data on the user interface that can be used to construct the SQL statement. The data dictionary 206 describes the data type of different elements on the user interface. In some implementations, the query processor is programmed to assign a default data type of "string" to any field that does not have a data type defined in the data dictionary, or if no data dictionary is provided.

In some implementations, the data dictionary may be determined using conventional techniques from a database management system and the MvSQL statement. For example, the MvSQL statement references the Employee_Table. By accessing the system catalogs for the relational database, the system can determine a data type for each column in the Employee_Table. In other implementations, the data dictionary may be a separate file or other data structure (for example, a hash table, dictionary, lookup table, etc.) that contains a mapping of different fields to their data types. For example, the Name field is mapped to a string and the HireDate and BirthDate fields are mapped to a datetime.

Figure 3:
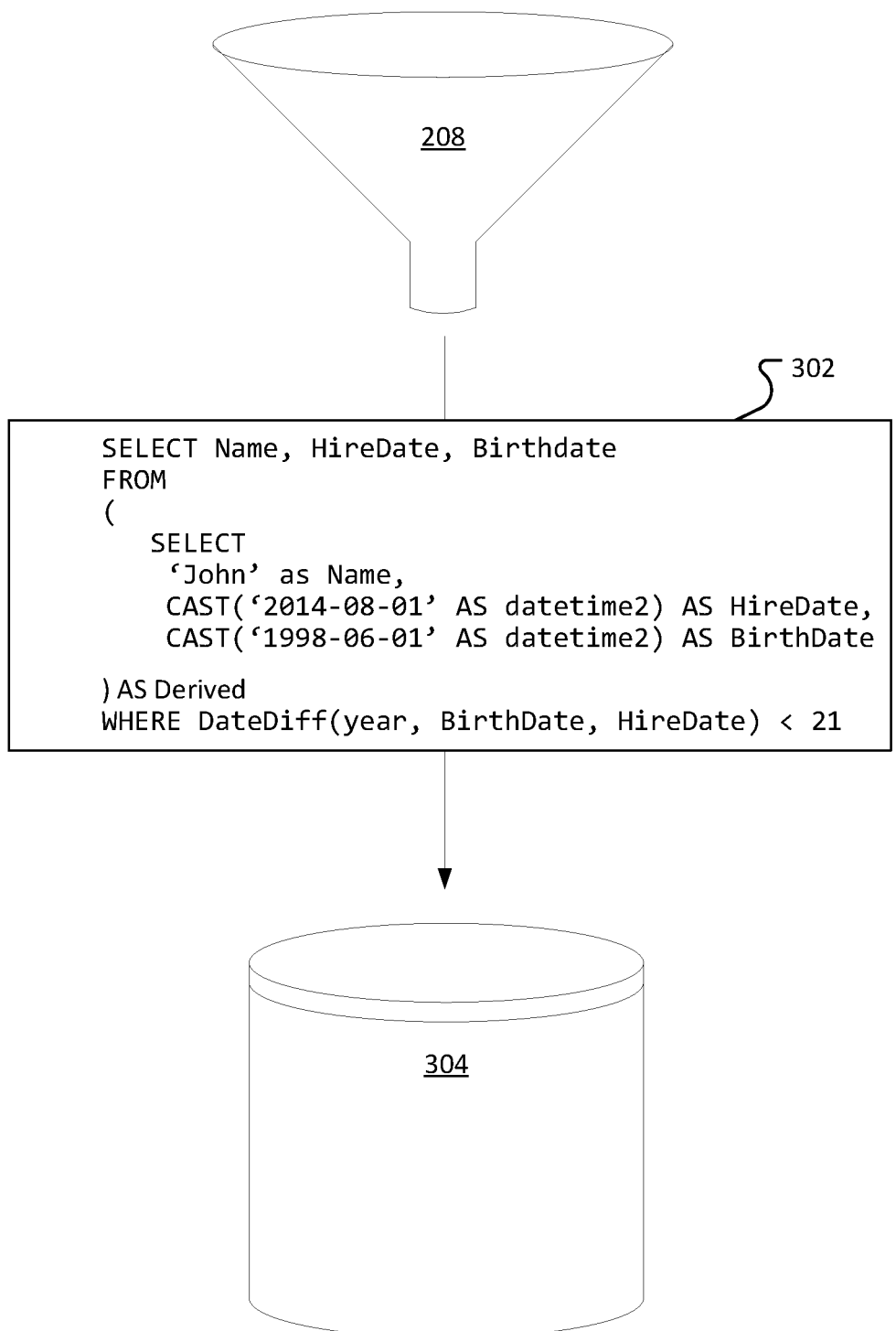

Referring to FIG. 3, the query processor 208 generates a SQL statement 302 using the MvSQL statement, the user interface, and the data dictionary.

The query process can identify columns and table referenced by the MvSQL statement. In this example, the query processor 208 identifies the columns Name, HireDate, BirthDate and the table Employee_Table. The columns and table may be identified by parsing the MvSQL statement using conventional parsing techniques (for example, regular expressions).

Data from the user interface is mapped into the columns. For each column, the query processor may identify a field on the user interface that corresponds to the column as well as any data type associated with the column. In some implementations, the fields on the user interface are identified by matching the name of the fields in the SQL statement to the fields having the same name on the user interface. In other implementations, the fields on the user interface are identified using a data structure that maps the name of the fields on the user interface to the name of the fields of the MvSQL statement. The data structure can be included in a separate file, table, or other persistent data store. In some implementations, the data structure can be stored on the HTML page displayed in the user interface (for example using hidden fields, scripting, or embedded in the comments).

In this example, the query processor identifies "John" as the "Name," "08/01/2014" as the "HireDate," and "06/01/1996" as the "Birthdate."

The query processor 208 replaces the identified table in the SQL statement with a command to create a derived table. The query processor creates the SQL statement that then creates the derived table using the values obtained from the user interface and applying an alias to the values. An alias is a second name that can be used to reference the data that is the subject of the alias. For example, in SQL the keyword AS is used to assign an alias to the column or a table. The AS keyword is inserted between the column name and the column alias or between the table name and the table alias.

The query processor may also cast some or all of the values into the appropriate data type. Casting is an operation that performs a type conversion that explicitly changes data of one data type (for example, a string) into another (for example, a date). Casting the data from the user interface into a particular type may be necessary for some functionality to work correctly; for example, certain functions can only be performed using data in a particular format. In this example, the query processor casts the "HireDate" and "Birthdate" fields to date time values. In some scenarios, it may be necessary to reformat the data provided by the user interface before the data can be cast into the appropriate type. In this example, the "HireDate" field contains a value in the format "mm/dd/yyyy", where "mm" is a two digit month, "dd" is a two digit day, and "yyyy" is a four digit year. The function that casts the value into a date requires the string to be in the format "yyyy-mm-dd." The query processor 208 can manipulate the data values from the user interface to generate strings in the appropriate formats for casting or other operations.

In this example, the command to create the derived table is "(SELECT 'John' as Name, CAST('2014-08-01' AS datetime2) AS HireDate, CAST('1998-06-01' AS datetime2) AS BirthDate) AS Derived". In this example, derived table includes a single row of data, however, other commands can be used to generate derived tables having multiple rows. In this example, the derived table is provided with an alias ("Derived").

The command to create the derived table is inserted into the SQL statement in place of the table. If the alias of the name of the derived table is different from the name of the table or tables included in the MvSQL statement, then the SQL statement can be updated to reference the derived table (for example, "SELECT DERIVED.NAME, DERIVED.HIREDATE, DERIVED.BIRTHDATE FROM . . . " or alternatively "SELECT DERIVED.*FROM . . . )."

The conditional logic in the where clause of the MvSQL statement remains at the end of the SQL statement.

Figure 4:
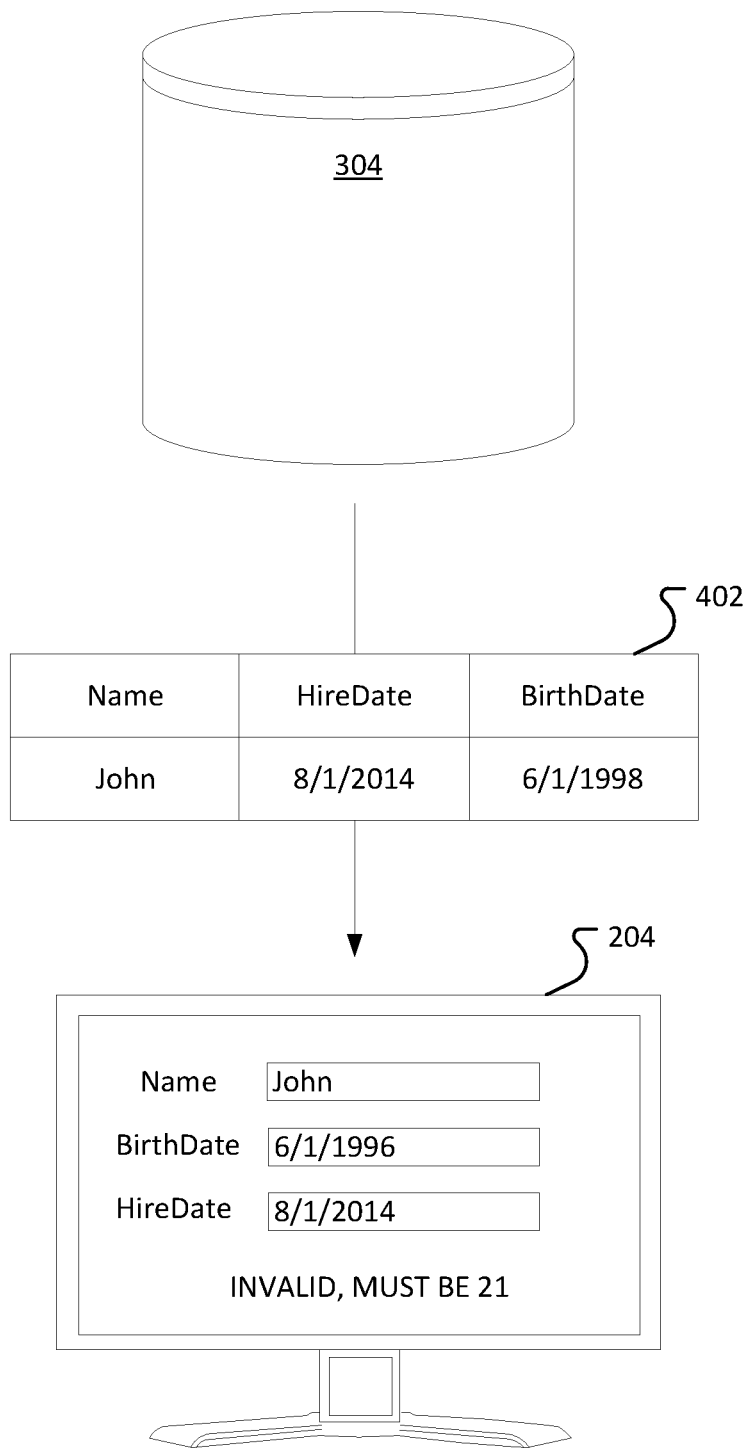

The SQL statement is sent to the database management system 304. The database management system 304 may be the database management system that provided the data dictionary or it may be another database management system. In this example, the database 304 is a relational database. Referring to FIG. 4, the database management system 304 executes the SQL statement. In this example, executing the SQL statement does not require the database management system to access data stored in the tables of the database management system.

In this example, the database management system identifies the row in the derived table as meeting the criteria described by the where clause (e.g. the difference between the hire date and the birth date is greater than 21 years). The database management system creates a record set or similar data structure to report the results of the SQL statement. In this example, the record set includes a single data record which includes the details from the derived table.

The user interface 204 receives the record set or receives data from a system that processes the record set. In response, the user interface 204 may update the display to present information. In this example, the user interface presents an error message indicating that the employee must be at least 21 years of age. In some implementations, the query process or other system receives the results of the query. The results of the query can be preprocessed before providing the data to the user interface. For example, a JAVA SERVLET can use the information in the result set to generate a new page to display on the user interface.

Figure 5:
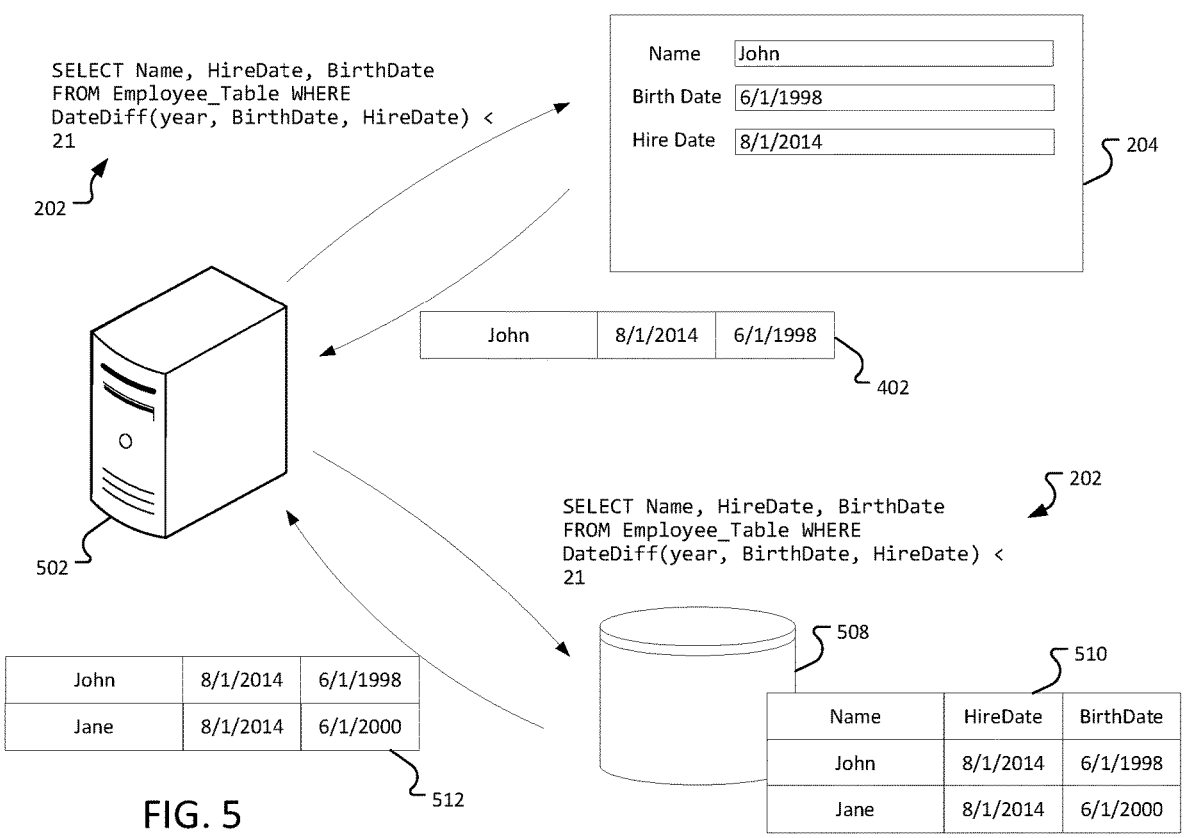
FIG. 5 illustrates an MVSQL statement being used to check data on a user interface and data in a database.

FIG. 5 illustrates an MvSQL statement being used to check data on a user interface and data in a database. The same MvSQL statement can be used to interact with data from a user interface and data stored in a database management system. For example, an application server 502 or other computer system can store MvSQL statements. The statement can be, for example, MvSQL statements that perform data validation. The statements can include, for example, the MvSQL statement 202.

As described above, the MvSQL statement 202 can be executed against the data from within a user interface 204. As described above, executing MvSQL statement 202 against the data on the user interface 204 can include processing the MvSQL statement as described above to generate a new SQL statement, including a derived table.

The MvSQL statement 202 can also be executed against data stored in a database management system 508. In this example, the database management system 508 includes an Employee_Table 510 that stores employee data. The SQL statement 202, when executed against the data in the Employee_Table table, produces two records 512, which are provided to the application server 502.

Figure 6:
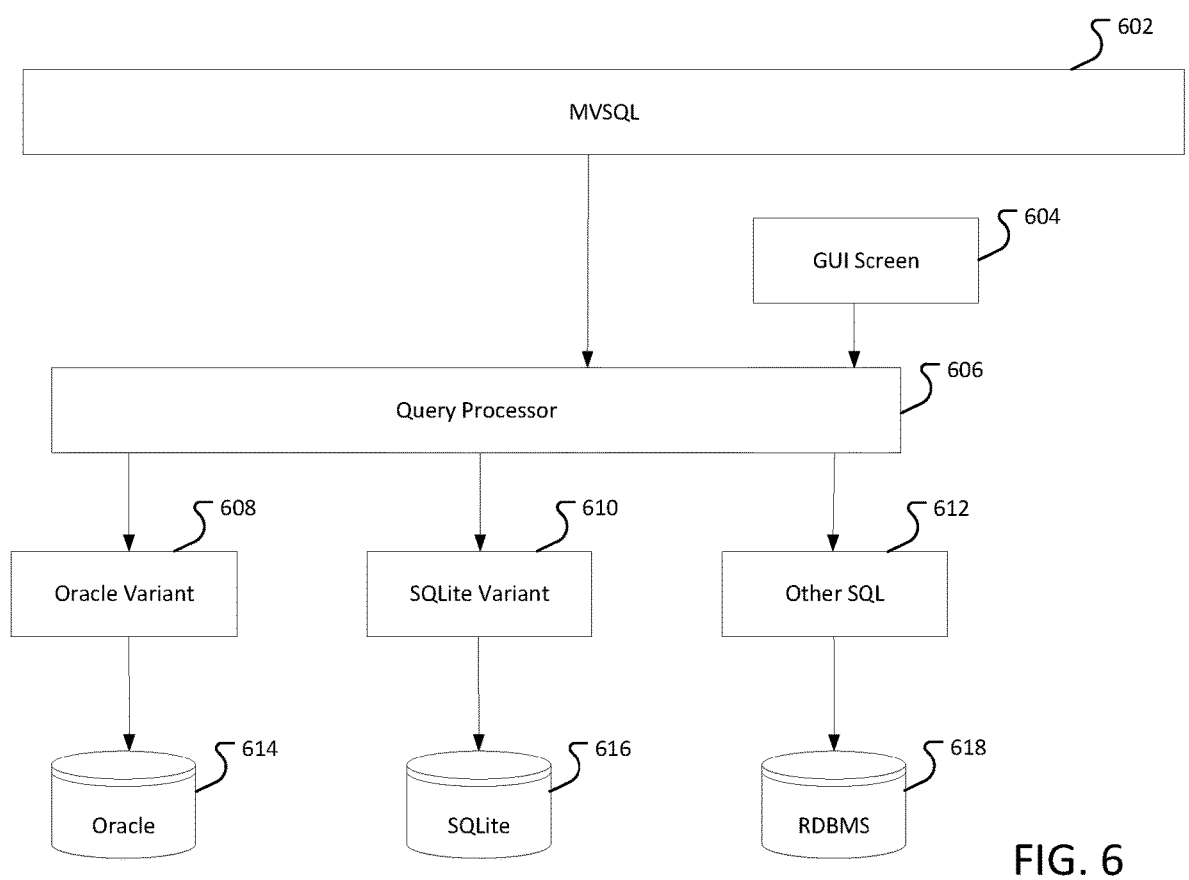
FIG. 6 illustrates transforming the MvSQL statement to different proprietary versions of SQL.

FIG. 6 illustrates the transformation of the MvSQL statement into different proprietary versions of SQL. The MvSQL statement may be further altered to account for variations in the SQL programming language as implemented in different database management systems.

A query processor 606 receives the MvSQL statement 602. The query processor 606 can transform the MvSQL statement 602 into an ORACLE specific variant 608 suitable for execution against an ORACLE database. For example, an ORACLE specific SQL statement for the MvSQL statement, "SELECT Name, HireDate, Birthdate, FROM Employee_Table WHERE DateDiff (year, BirthDate, HireDate)<21," may be:

SELECT Name, HireDate, BirthDate
FROM Employee_Table
WHERE floor(months_between(BirthDate, HireDate)/12)<21

The query process 606 can transform the MvSQL statement 602 into a SQLite specific variant 610 suitable for execution against SQLite 616. For example, an SQLite specific SQL statement for the MvSQL statement, "SELECT Name, HireDate, Birthdate, FROM Employee_Table WHERE DateDiff (year, BirthDate, HireDate)<21," may be:

SELECT Name, HireDate, BirthDate
FROM Employee_Table
WHERE (strftime('% Y', HireDate)-strftime('% Y', BirthDate))-(strftime('% m-% d', HireDate)<strftime('% m-% d', BirthDate))<21

The query processor 606 can also transform the MvSQL statement 602 into other SQL variants 612 to access other relational database management systems (RDBMS) 618. For example, a MICROSOFT SQL SERVER specific variant of the MvSQL statement, "SELECT Name, HireDate, Birthdate, FROM Employee_Table WHERE DateDiff (year, BirthDate, HireDate)<21," may be:

SELECT Name, HireDate, BirthDate
FROM Employee_Table
WHERE DATEDIFF(YEAR, BirthDate, HireDate)<21

A MYSQL specific variant of the MvSQL statement, "SELECT Name, HireDate, Birthdate, FROM Employee_Table WHERE DateDiff (year, BirthDate, HireDate) <21," may be:

SELECT Name, HireDate, BirthDate
FROM Employee_Table
WHERE TIMESTAMPDIFF(YEAR, BirthDate, HireDate)<21

Figure 7:
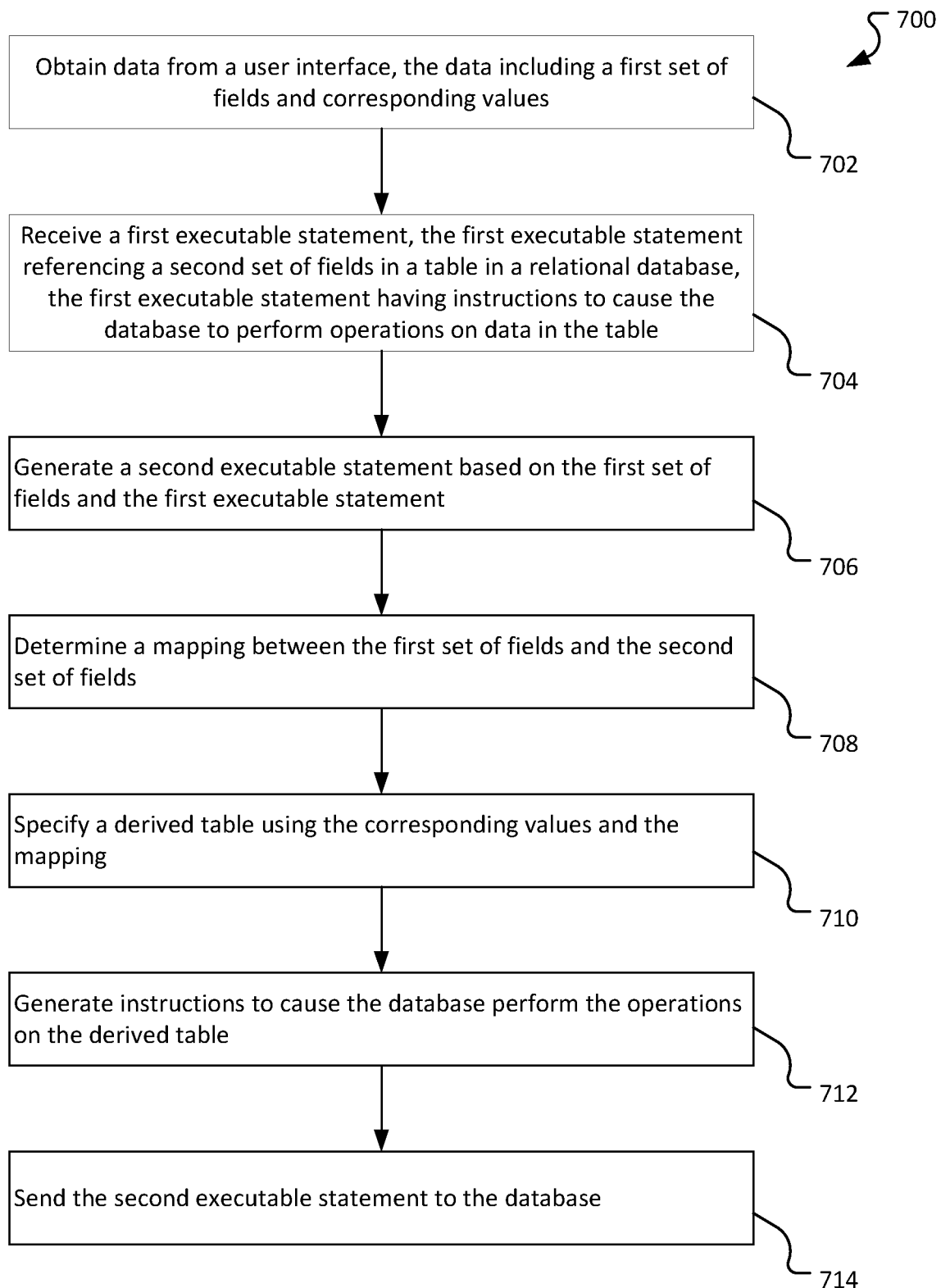
FIG. 7 is a flowchart of a process for using a source independent query language on data from a user interface.

FIG. 7 is a flowchart of a process 700 for using a source independent query language on data from a user interface. The process can be performed by one or more computers operating sequentially or in parallel. The process can be performed using conventional distribution programming techniques with some of the steps in the process being performed in parallel.

The process 700 obtains data from a user interface, where the data includes a first set of fields and corresponding values (702). The values can be obtained from the user interface using, for example, a scripting programming language that retrieves data from the user interface and sends that data to a server. The values can also be obtained through the submission of a form on the user interface.

The process 700 receives a first executable statement, where the first executable statement references a second set of fields in a table in a relational database. The first executable statement also having instructions to cause the database to perform operations on data in the table (704). The first executable statement can be, for example, an MvSQL statement.

The process 700 generates a second executable statement based on the first set of fields and the first executable statement (706). The second executable statement is configured to perform the operations described in the first executable statement on the data from the user interface.

Generating the second executable statement includes determining a mapping between the first set of fields and the second set of fields (708). In order to generate the second executable statement, the system identifies columns in the first executable statement and maps the columns of the first executable statement to the data from the user interface. Mapping the columns to the data can include identifying a data type associated with the data. For example, if the column is numeric, but the data is a string, the system can convert the data into the appropriate type, or it can provide instructions that cause the second executable statement to perform the conversion.

The generation of the second executable statement also includes specifying a derived table using the corresponding values and the mapping (710). The process 700 can construct a command to generate a derived table using the data from the user interface, including any data conversion operations that were identified.

Generating the second executable statement also includes instructions to cause the database to perform the operations on the derived table (712). In some implementations, the process 700 can insert the command to generate the derived table into the SQL statement in place of the table or tables identified in the from clause of the statement.

The process 700 sends the second executable statement to the database (714). The database can receive the second executable statement and perform the operations described by the statement on the data identified by the derived table.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs (i.e., one or more modules of computer program instructions, encoded on computer storage medium for execution by, or to control the operation of, data processing apparatus).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry (e.g., an FPGA (field programmable gate array) or an ASIC (application-specific integrated circuit)). The apparatus can also include (in addition to hardware) code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages and/or declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry (e.g., an FPGA (field programmable gate array) or an ASIC (application-specific integrated circuit)).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic disks, magneto-optical disks, or optical disks), however, a computer need not have such devices. Moreover, a computer can be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive)). Devices suitable for storing computer program instructions and data include all forms of non-transitory computer-readable media and memory devices, including by way of example semiconductor memory devices (e.g., EPROM, EEPROM, and flash memory devices), magnetic disks (e.g., internal hard disks or removable disks), magneto-optical disks, and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device (e.g., a CRT (cathode ray tube) or LCD (liquid crystal display) monitor) for displaying information to the user and a keyboard and a pointing device (e.g., a mouse or a trackball), by which the user can provide input to the computer. Other kinds of devices can be used to provide for interaction with a user as well; for example, feedback provided to the user can be any form of sensory feedback (e.g., visual, auditory, or tactile feedback) and input from the user can be received in any form, including acoustic, speech, or tactile input. In addition, a computer can interact with a user by sending documents to and receiving documents from a device that is used by the user (for example, by sending web pages to a web browser on a user's client device in response to requests received from the web browser).

Embodiments of the subject matter described in this specification can be implemented in a computing system that includes a back-end component (e.g., as a data server), a middleware component (e.g., an application server), or a front-end component (e.g., a client computer having a graphical user interface or a Web browser through which a user can interact with an implementation of the subject matter described in this specification), or any combination of one or more such back-end, middleware, or front-end components. The components of the system can be interconnected by any form or medium of digital data communication (e.g., a communication network). Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, the method comprising:
   obtaining data from a user interface, the data including a first set of fields and corresponding values;
   executing a first executable statement against the data obtained from the user interface, including:
      receiving the first executable statement, the first executable statement referencing a second set of fields in a dataset, the first executable statement having instructions to cause a query processor to perform operations on data in the dataset;
   generating a second executable statement based on the first set of fields and the first executable statement, comprising:
      determining a mapping between the first set of fields and the second set of fields,
      specifying a derived dataset using the corresponding values and the mapping; transforming at least some of the corresponding values from the user interface to one or more other values based on the mapping; and
      generating instructions comprising at least one proprietary function corresponding to at least one of the operations of the first executable statement, the generated instructions configured to cause the query processor to perform the operations on the derived dataset including the at least one operation; and
   sending the second executable statement to the query processor.

2. The method of claim 1, further comprising:
   receiving result data from the query processor associated with the execution of the operations in the second executable statement;
   determining that the data from the user interface is invalid based on the result data.

3. The method of claim 1, wherein generating the second executable statement further comprises:
   inserting the proprietary function into the second executable statement.

4. The method of claim 1, further comprising:
   validating data in the query processor by providing the second executable statement to the query processor.

5. The method of claim 1, wherein generating a second executable statement based on the first set of fields and the first executable statement further comprises:
   providing an alias for the derived dataset; and
   updating the second executable statement to reference the alias.

6. A non-transitory computer storage medium encoded with computer program instructions that when executed by one or more computers cause the one or more computers to perform operations comprising:
   obtaining data from a user interface, the data including a first set of fields and corresponding values;
   executing a first executable statement against the data obtained from the user interface, including:
      receiving the first executable statement, the first executable statement referencing a second set of fields in a dataset, the first executable statement having instructions to cause a query processor to perform operations on data in the dataset;
   generating a second executable statement based on the first set of fields and the first executable statement, comprising:
      determining a mapping between the first set of fields and the second set of fields,
      specifying a derived dataset using the corresponding values and the mapping;
      transforming at least some of the corresponding values from the user interface to one or more other values based on the mapping; and
      generating instructions comprising at least one proprietary function corresponding to at least one of the operations of the first executable statement, the generated instructions configured to cause the query processor to perform the operations on the derived dataset including the at least one operation; and sending the second executable statement to the query processor.

7. The non-transitory computer storage medium of claim 6, further comprising:

receiving result data from the query processor associated with the execution of the operations in the second executable statement;

determining that the data from the user interface is invalid based on the result data.

8. The non-transitory computer storage medium of claim 6, wherein generating the second executable statement further comprises:

inserting the proprietary function into the second executable statement.

9. The non-transitory computer storage medium of claim 6, further comprising:

validating data in the query processor by providing the second executable statement to the query processor.

10. The non-transitory computer storage medium of claim 6, wherein generating a second executable statement based on the first set of fields and the first executable statement further comprises:

providing an alias for the derived dataset; and updating the second executable statement to reference the alias.

11. A system comprising:

one or more computers and one or more storage devices storing instructions that are operable, when executed by the one or more computers, to cause the one or more computers to perform operations comprising:

obtaining data from a user interface, the data including a first set of fields and corresponding values;

executing a first executable statement against the data obtained from the user interface, including:

receiving the first executable statement, the first executable statement referencing a second set of fields in a dataset, the first executable statement having instructions to cause a query processor to perform operations on data in the dataset;

generating a second executable statement based on the first set of fields and the first executable statement, comprising:

determining a mapping between the first set of fields and the second set of fields, specifying a derived dataset using the corresponding values and the mapping;

transforming at least some of the corresponding values from the user interface to one or more other values based on the mapping; and generating instructions comprising at least one proprietary function corresponding to at least one of the operations of the first executable statement, the generated instructions configured to cause the query processor to perform the operations on the derived dataset including the at least one operation; and sending the second executable statement to the query processor.

12. The system of claim 11, further comprising:

receiving result data from the query processor associated with the execution of the operations in the second executable statement;

determining that the data from the user interface is invalid based on the result data.

13. The system of claim 11, wherein generating the second executable statement further comprises:

inserting the proprietary function into the second executable statement.

14. The system of claim 11, further comprising:

validating data in the query processor by providing the second executable statement to the query processor.

15. The system of claim 11, wherein generating a second executable statement based on the first set of fields and the first executable statement further comprises:

providing an alias for the derived dataset; and updating the second executable statement to reference the alias.

* * * * *

UNITED STATES PATENT AND TRADEMARK OFFICE
CERTIFICATE OF CORRECTION

PATENT NO. : 10,558,644 B2
APPLICATION NO. : 15/407811
DATED : February 11, 2020
INVENTOR(S) : Thomas R. Kennedy, Jr.

Page 1 of 1

It is certified that error appears in the above-identified patent and that said Letters Patent is hereby corrected as shown below:

On the Title Page

Column 2 (Abstract), Line 8 (Approx.), delete "Generating" and insert -- generating --.

Signed and Sealed this
Second Day of June, 2020

Andrei Iancu
*Director of the United States Patent and Trademark Office*